July 6, 1965

E. M. NOEL 3,192,975

MUFFIN SPLITTING MECHANISM

Filed Feb. 17, 1961

INVENTOR.
Eugene M. Noel,
BY
ATTORNEYS.

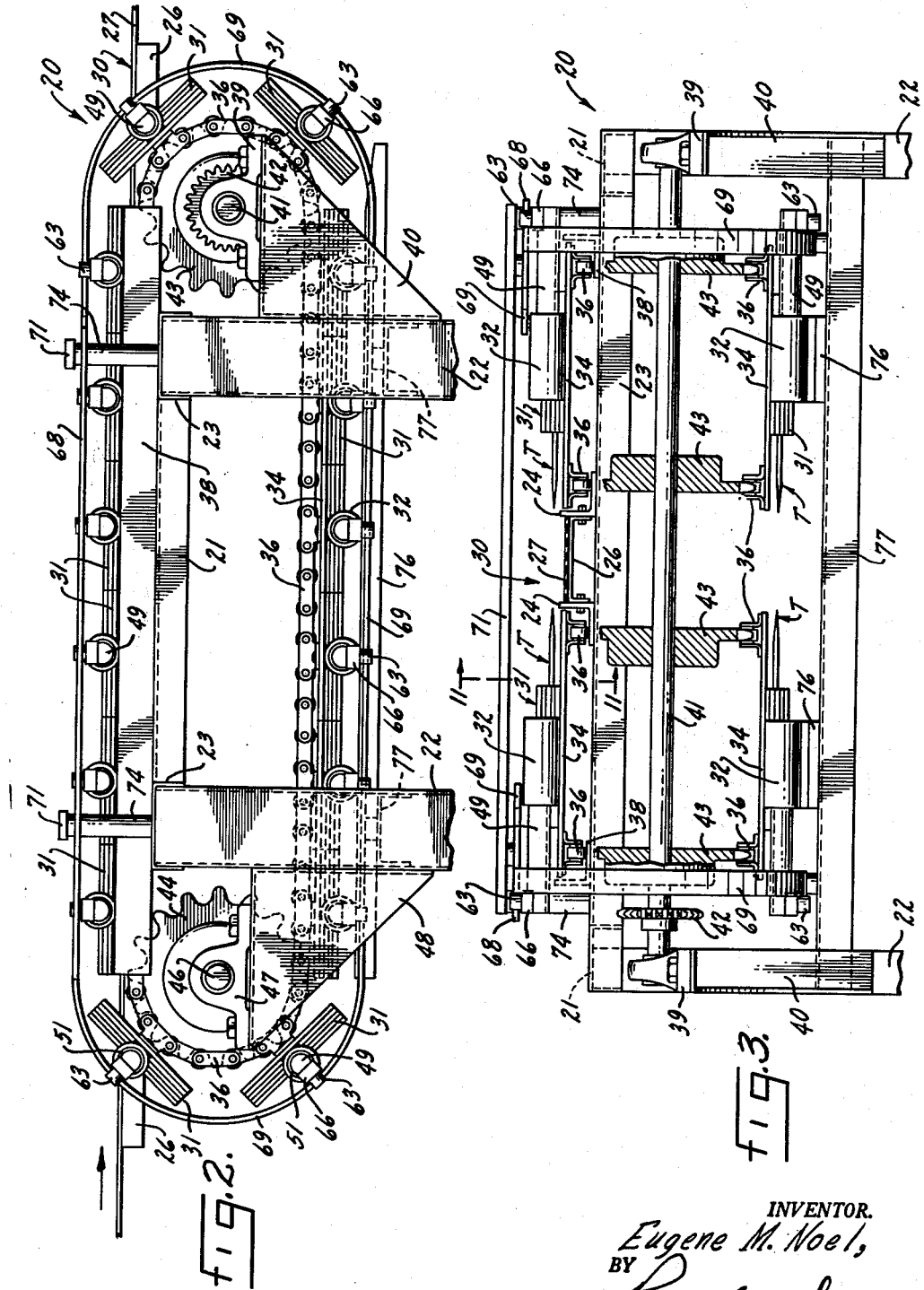

July 6, 1965
E. M. NOEL
3,192,975
MUFFIN SPLITTING MECHANISM
Filed Feb. 17, 1961
4 Sheets-Sheet 3
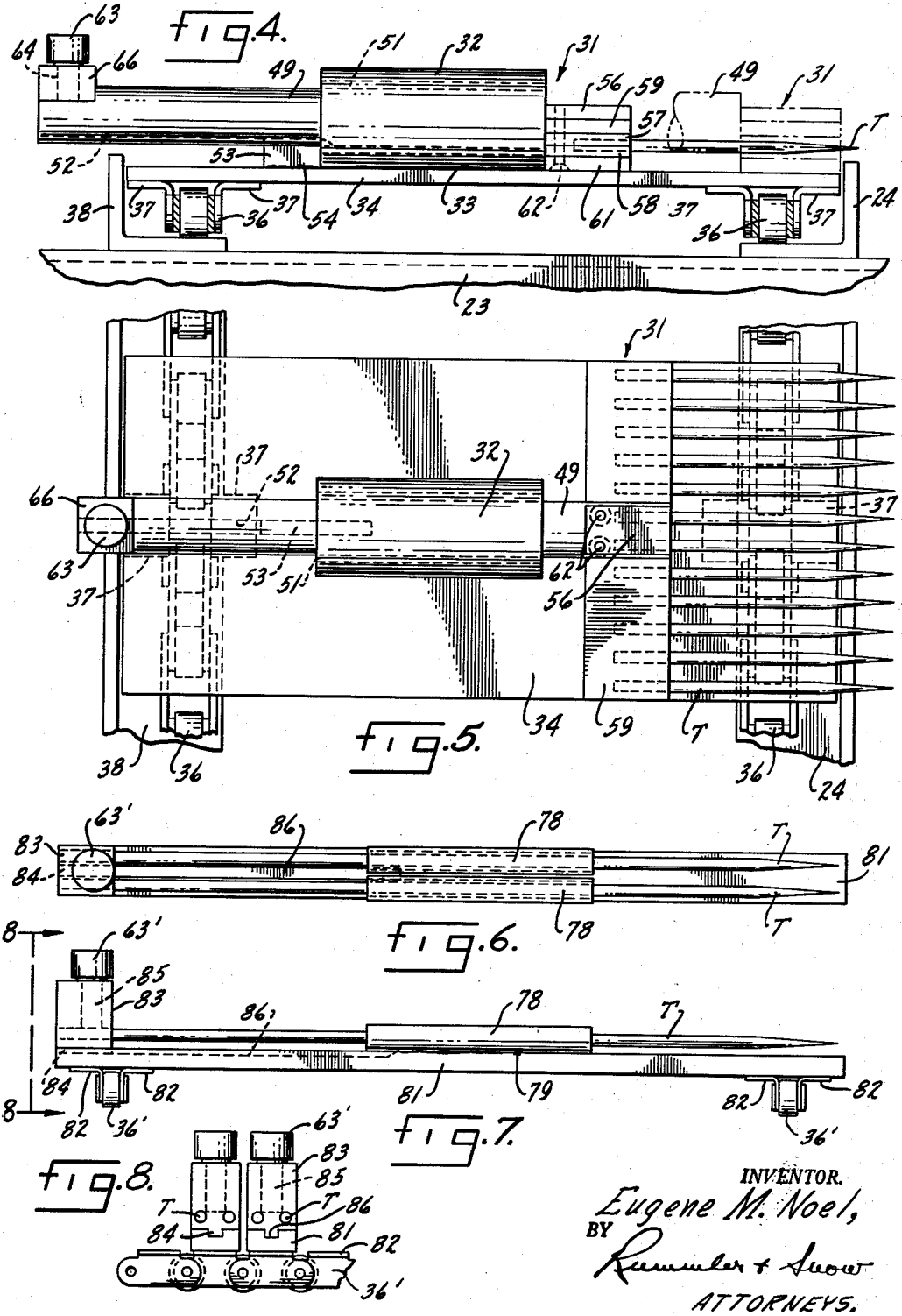
INVENTOR.
Eugene M. Noel,
BY
ATTORNEYS.

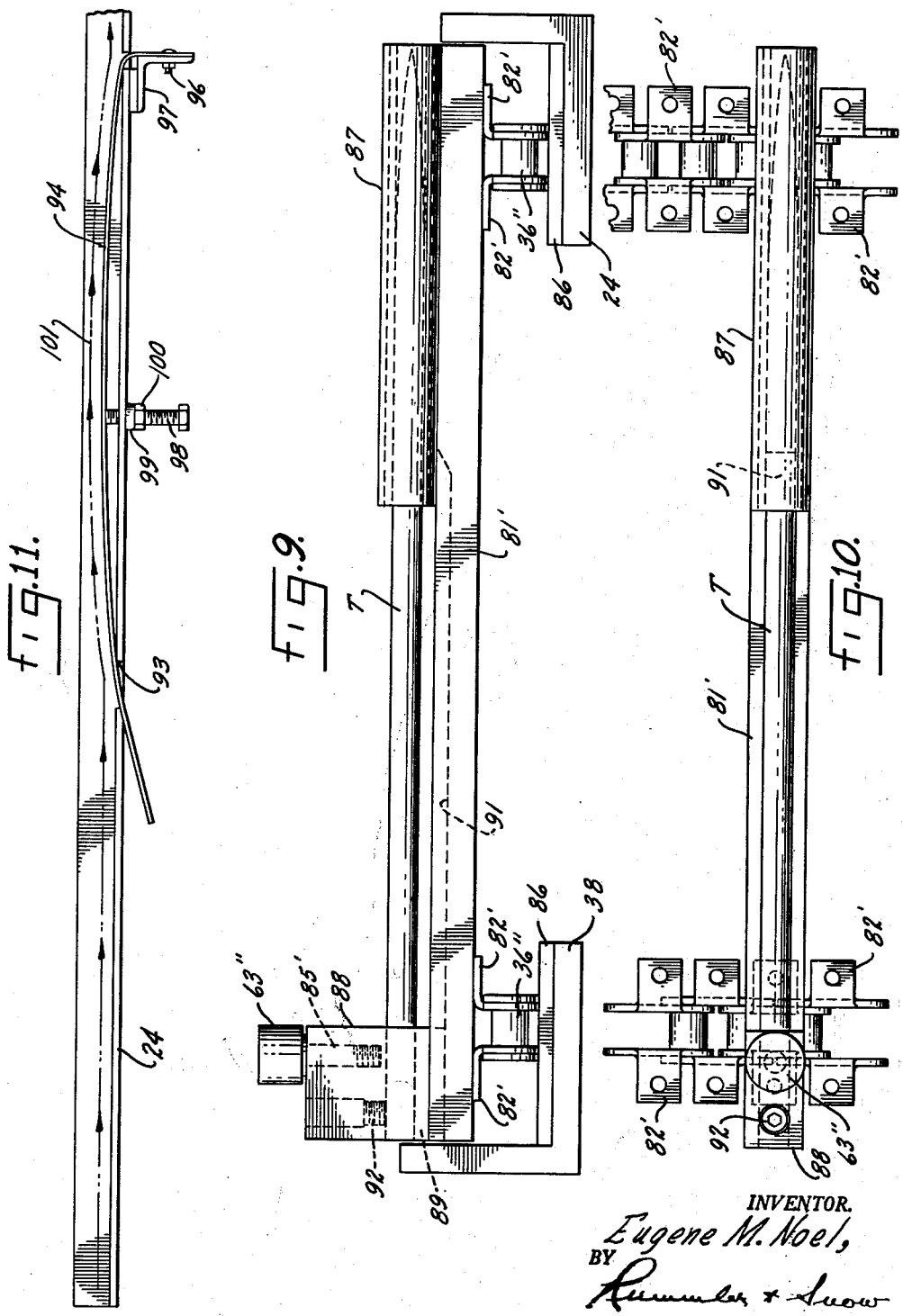

United States Patent Office 3,192,975
Patented July 6, 1965

3,192,975
MUFFIN SPLITTING MECHANISM
Eugene M. Noel, 238 Main St., Cambridge 42, Mass.
Filed Feb. 17, 1961, Ser. No. 90,084
16 Claims. (Cl. 146—72)

This invention relates generally to mechanisms for preparing muffins, and particularly to mechanisms for splitting English muffins or the like so that the muffin halves present uniform, open-texture surfaces for subsequent toasting, grilling or the like.

The mechanism according to the present invention comprehends the movement of the muffin along a conveyor where they are pierced from opposite sides by interdigitating tines supported for movement orbitally on flights which travel in the same direction as the muffin conveyor. The tines enter the muffins in a transverse piercing operation and then retract therefrom to provide the muffin with a multiplicity of closely spaced holes or perforations which enables it be torn apart along what may be likened to a weakened cleavage plane. The resultant muffin halves, instead of having smooth surfaces which would result from the usual knife or saw blade splitting operation have open-texture and somewhat roughened surfaces which make the muffin halves more desirable for toasting and grilling. Also, with the present mechanism the muffins are more uniformly divided so that the resulting halves are of substantially equal thickness to facilitate mechanical toasting or grilling procedures.

In another embodiment of the invention the muffins are not only pierced by the tines, but one of the sets of interdigitating tines is enabled to move out of the plane of the other set, so that a positive tearing or separating action is afforded, which serves greatly to provide the desired open-texture of the muffin halves.

With the foregoing considerations in mind, it is a principal object of the invention to provide automatic mechanism for splitting muffins, so that they may be thereafter completely separated into muffin halves with open-texture surfaces suitable for grilling or toasting.

Another object is to provide mechanism consisting of interdigitating tines which enter the muffin from opposite sides and subsequently retract therefrom, so as to split the muffin into discrete halves, except where they remain joined between the openings therein where the tines have extended into and withdrawn from the muffin.

Still another object is to provide continuously operating mechanism for conveying the muffins, and to provide in such mechanism orbitally moving tines which enter the muffin to pierce the same and to control the piercing movement of the tines by a cam and follower structure cooperating with the tines as they move in an orbital path.

Yet another object is to provide an automatic muffin piercing structure characterized by sets of tines which enter the muffin and then retract therefrom, one set of such tines moving out of the plane of the other, so as to effect a complete separation of the muffin into halves provided with the desired open-texture.

Other objects and important features of the invention will be apparent from a study of the following specification taken with the drawings, which together describe and illustrate a specific embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

FIG. 2 is an elevational view of the same looking in the direction of the arrows 2—2 of FIG. 1;

FIG. 3 is a transverse sectional view, certain parts being shown in elevation, looking substantially in the direction of the arrows 3—3 of FIG. 1;

FIG. 4 is a detailed elevational view, on an enlarged scale, showing a tine supporting flight, and details of structure for moving the tines in a direction to enter the muffin and withdraw therefrom;

FIG. 5 is a plan view of FIG. 4, but showing the tine unit in partly projected position;

FIG. 6 is a plan view of an alternate form of tine flight structure and means for supporting and guiding the tines;

FIG. 7 is an elevational view thereof;

FIG. 8 is an end view, looking in the direction of the arrows 8—8 of FIG. 7, showing a pair of the tine flight units of FIGS. 6 and 7;

FIG. 9 is an elevational view of structure, according to another embodiment of the invention, for supporting and moving a single tine;

FIG. 10 is a plan view thereof; and

FIG. 11 is an elevational view, as on line 11—11 of FIG. 3, showing structure for moving one of the sets of interdigitating tines out of the plane of the other set, so as to effect substantially complete separation of the muffin halves.

Figure 1:
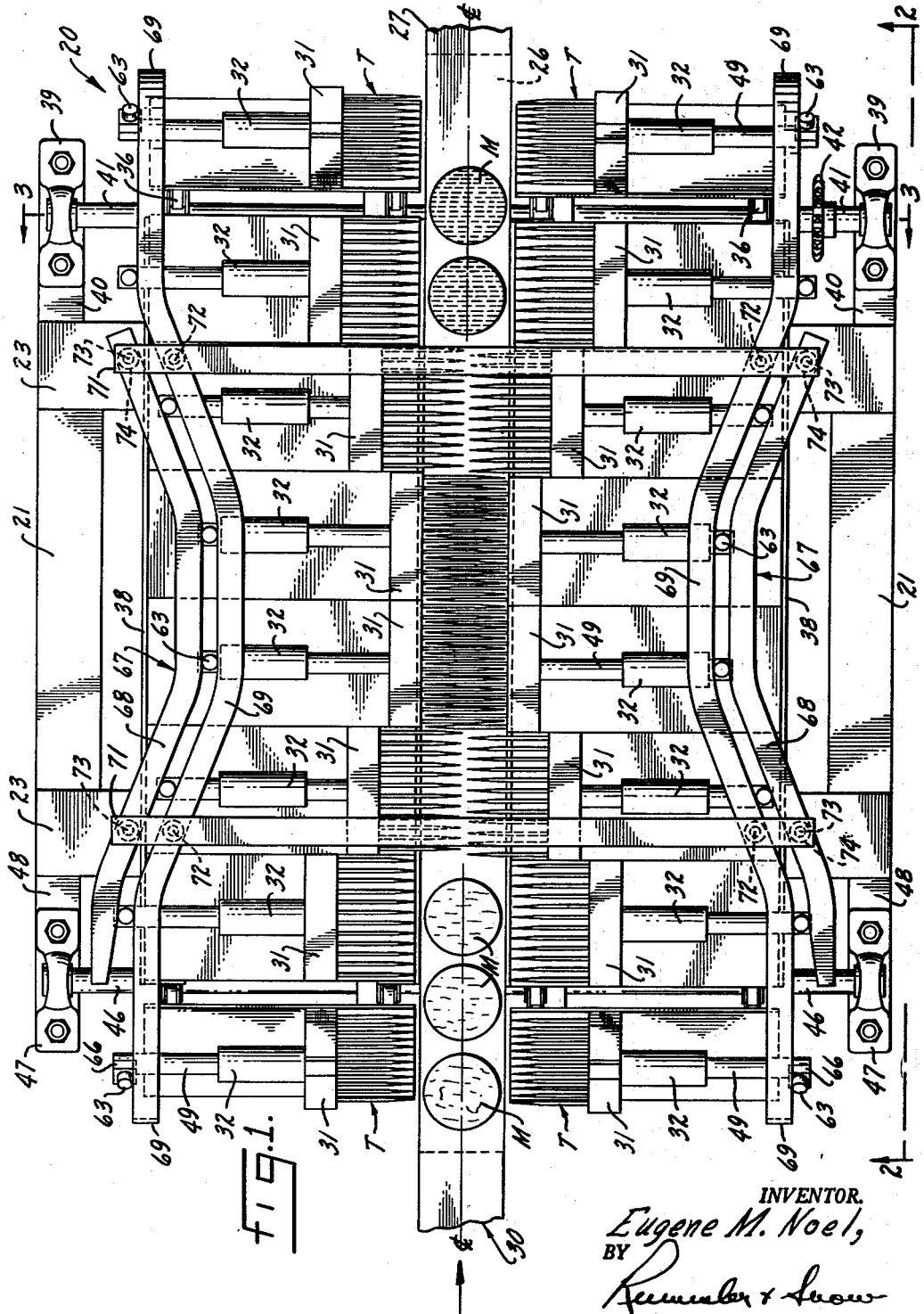
FIG. 1 is a plan view of a muffin splitting mechanism embodying the improvements according to the present invention.

Referring now particularly to FIGS. 1 to 3 of the drawings, the muffin splitting mechanism according to the present invention is referred to generally by the reference numeral 20 and includes laterally spaced side frames 21 which are supported on legs 22. The frame members 21 are spanned by spaced transverse members 23, and together with side frames 21 and legs 22 define a spaced frame.

Laterally spaced angles 24, FIG. 3, are secured to the transverse members 23 substantially midway between the ends thereof and define, with an inverted channel 26 disposed between the angles 24 and secured thereto, a guide for a conveying reach 27 of a muffin conveyor referred to generally by the reference numeral 30. The reach 27 is driven in any convenient manner, and may be part of a continuous conveyor onto which the muffins M are delivered automatically as they are discharged from a continuous griddle such as that shown in my Patent No. 2,859,713, the reach 27 also supporting the muffins at the muffin splitting mechanism 20.

The structure for effecting separation of the grilled muffins into muffin halves having open-textured surfaces for toasting, comprises opposed sets of tines T which are arranged, as seen in FIG. 1, to move toward each other in interdigitating relationship to enter the muffin M and to withdraw therefrom as they are moved along paths parallel with the conveyor 30. The tines T in such movement are in a plane spaced above the plane of the conveying reach 27 so as to engage the muffin substantially midway between its top and bottom surfaces.

Referring now also to FIG. 4 of the drawings, the tines T are arranged as sets thereof referred to generally by the reference numeral 31. Each set of tines 31 is movable with respect to a support block 32 welded at 33 to a conveyor flight 34. A pair of endless roller chains or strands 36 are arranged in laterally spaced relationship to carry a plurality of the flights 34 and as seen in FIG. 4 each endless chain 36 has longitudinally spaced lugs 37 thereon which are secured in any convenient fashion to the underside of the flight 34. The outer chain 36 is guided upon an angle track 38 which rests upon and is secured to the cross-members 23 in outwardly spaced relation to a respective one of the angles 24 which, as shown, is disposed to support and guide the inner chain 36.

As shown in FIGS. 1 and 3, the muffin splitting mechanism comprises two of the conveyor assemblies of FIG. 4, one on each side of the muffin conveyor 27. These conveyor assemblies are identical, except for hand, and therefore the following description of one assembly will also apply for the other, both as to structure and operation.

Structure is provided for driving the endless sprocket chains 36, and to this end the frame legs 22 support pillow blocks 39 mounted on brackets 40 secured to the legs 22. The pillow blocks 39 support a drive shaft 41 extending therebetween. A drive sprocket 42 is fast on the shaft 41 and drives sprockets 43 engaging the chains 36.

The sprocket chains 36 are reversed in direction about idler sprockets 44 mounted at the rearward end of the apparatus on an idler shaft 46 supported at each end in pillow blocks 47 mounted on brackets 48 secured to the rearward standards 22.

As shown in FIGS. 1, 4 and 5, the tines T are arranged to move in the direction transverse of the chains 36 on a slide bar 49 which is guided in a bushing 51 within the support block 32. The bar 49 has a keyway 52 therein and is guided on a key 53 welded at 54 to upper surface of the flight 34. An integral tongue 56 extends from the forward end of the bar 49, and the tines T are mounted on the tongue 56 between fibre pads 57 and 58 held by a pair of transversely extending clamp plates. An upper clamping plate 59 and a lower clamping plate 61 hold the fibre pads 57 and 58 between them and the assembly is held together and on the bottom side of the tongue 56 by a pair of countersunk screws 62.

As shown in FIGS. 1 to 5 inclusive, the tine units 31 each comprise twelve parallel tines uniformly spaced apart in a common plane, preferably on half-inch centers, and the pads 57–58 together with the clamp plates 59–61 are mounted on the tongue 56 so as to extend transversely of the slide bar 49 normal thereto. Also the units are arranged on the chains 36 to follow each other directly so that the spacing of the tines from unit to unit, will remain the same throughout the length of the apparatus.

Structure is provided for causing the tine units T to move laterally of the conveyor reach 27 successively in a direction towards the muffins M to pierce the same and then withdraw therefrom, and to this end each of the slide bars 49 is provided with a cam follower 63 turning freely upon a cap screw 64 which in turn secures a spacer block 66 mounted on the rearward end of the slide bar 49. The cam followers 63 cooperate with a cam 67 consisting of a pair of spaced rails 68 and 69 between which the cam follower roller 63 is guided. Rail 69 depends from straps 71 which extend across the machine, as seen in FIG. 1, rails 69 being secured to the strap 71 by screws 72. Strap 71 is supported at its ends on standards 74, and rail 68 is positioned between the top of standard 74 and strap 71, and is held in position to standard 74 by screws 73.

As seen in FIG. 2, the inner rail 69 is continuous so as to guide the followers 63 in their return movement and hold them in retracted position until time for the tines to be projected, see also FIG. 3, and the flight assembly is additionally supported during the return or lower run of the chains 36, by fibre wear pads 76 extending longitudinally of the mechanism and upon which the support block 32 slides, the wear pads 76 resting upon laterally extending members 77 secured at each end to the legs 22.

It will be seen from the description thus far that the machine is substantially symmetrical about the center line indicated in FIG. 1, and that the tine units T of both conveyor assemblies are adapted, by reason of the configuration of the cams 67, to enter the muffins M, moving on the conveyor 30, from opposite sides thereof and to be withdrawn therefrom after the piercing operation has been completed. It will be noted that the tines are in interdigitating relationship, as shown in FIG. 1, so that each muffin is provided with a plurality of closely spaced apertures or passageways therein which are separated only by a thin web of the muffin. By so preparing the muffins they can be readily separated into halves, with the separated surfaces providing a uniform, open-texture for subsequent toasting either by a conventional electric toaster or by open flame method. Interdigitation of the tine units of the two conveyor assemblies may be accomplished by setting one conveyor slightly in advance of the other, as shown in FIG. 1, or by mounting the tines on the slide bars of one conveyor in offset relation with respect to the tines on the other conveyor.

Referring now to FIGS. 6 to 8 of the drawings, there is shown another embodiment of the invention wherein the muffin splitting tine unit comprises only a pair of the tines T arranged to be controlled in its movement by the cam follower mechanism described with reference to FIGS. 1 to 5 inclusive. In this embodiment of the invention, tines T are slidable in a pair of generally cylindrical guides 78, each of which is welded as at 79 to a narrow flight plate 81 held to lugs 82 of the conveyor chain 36'. In this embodiment of the invention, the tines T are supported at their rearward ends in a slide block 83 having a tongue or key 84 guided in a keyway 85 of the plate 81 (see FIG. 8). The slide block 83 supports a rotatable follower 63' which is supported thereon by a cap screw 85 which also secures the tines in the slide block 83. In this embodiment each link of the chain 36' supports a flight plate, and the plate as well as the spacing of the tines is proportioned so that the uniform and equal spacing of the tines on one plate is maintained between successive plates throughout the conveyor assembly.

Referring now to FIGS. 9 and 10 of the drawings, there is shown another embodiment of the invention wherein the flight plate 81' supports a single tine T. The flight plate 81' is mounted on lugs 82' extending from each of the conveyor chains 36''. In this embodiment of the invention, the chains 36'' need not be of the roller chain type and in the form shown, each is supported upon wear plates 86 resting on the respective angle tracks 24 and 38.

In the form shown, the flight 81' has a bushed tubular guide 87 for the tine T, and the tine T is supported in a slide block 88 having a key 89 which slides in a keyway 91 formed in the upper surface of the flight plate 81'. Movement is given to the block 88 by the cam roller follower 63'' mounted upon the cap screw 85'. The tine T is held in position within the block 88 by means of a set screw 92.

The structure described with reference to FIGS. 6 to 10 inclusive of the drawings is particularly effective where it is desired to move one set of tines out of the plane of the opposite set of tines and in a direction generally normal to the plane of the conveyor 30, while the tines are in interdigitating, muffin piercing position, so as to positively separate one muffin half from the other.

Referring now to FIG. 11 of the drawings, there is shown one arrangement for effecting a separating movement of the tines of one of the conveyor assemblies relative to the other conveyor assembly while the tines are in interdigitating or muffin piercing position. In using this arrangement each of the guide or track angles 24 and 38 of one tine conveyor assembly, or at least the track angle 24 next adjacent the conveyor 30, is provided with an opening 93 in its lateral leg, and a strap-like spring steel guide member 94 is positioned to extend along the said lateral leg of the guide angle 38 for a predetermined distance from the said opening in the direction of conveyor travel. The opening 93 is located at a point in the conveyor travel immediately following the point of full interdigitation of the opposing tine units, and the strap guide member 94 is made to terminate at approximately the point in conveyor travel where the tines begin to withdraw from the muffin. At its end remote from the opening 93 the spring steel strap 94 is held by a bolt 96 to an angle member 97 secured in any convenient fashion to the underside of the lateral leg of the track angle 24, and for this purpose the track 24 is interrupted to permit the strap to pass through the chain guiding surface. The opposite end of the strap 94 simply passes through the opening 93 to the underside of the track where it is free of attachment, thus leaving the intermediate portion of the strap free to flex. As shown, the spring steel guide member 94 is adjusted to rise above the surface of the chain supporting leg of the angle 24 by means of an adjusting screw 98 threaded through a suitable boss 99 on the bottom side of the leg adjacent the middle of the guide member. The screw 98 is secured in the desired position by a lock nut 100 and serves to elevate the medial portion of the guide member above the level of the track 24, so as to provide a rising and falling track surface for the respective conveyor strand, which in transit over the guide member will follow a path such as indicated by the arrows 101.

It will now be seen that, within the area of full interdigitation of the tines of opposing tine units, each of the conveyor chains 36 for one of the tine conveyor assemblies, or at least the innermost chain thereof, is enabled to rise above the level of the track 24, thereby lifting the tine units of the one assembly relative to the tine units of the opposite assembly, so as to physically tear the muffin halves apart. The amount of rise or lift of the one set of tines relative to the opposing set need only be just sufficient to separate the muffin halves from each other, and in this respect the steel strap member 94 functions as an adjustable cam which by means of the adjustment screw 98 can vary the amount of rise of the tine conveyor chain so as to produce substantially any desired extent of lift of one set of tines with respect to its opposing set.

This lifting movement of the tines of one conveyor assembly separates the muffin halves from each other for a brief period, or until the elevated tines are returned to their normal track level, the opposite set of tines holding one-half of the muffin down against the conveyor 30 in the meantime. This brief physical separation of the muffin halves has the added advantage of permitting a rapid escape of moisture from the interior of the muffins so that the split halves are less likely to become so adhered to each other, upon being brought again together subsequent to the splitting operation, as to make manual separation by the ultimate user difficult.

In the operation of the improved muffin splitting mechanism herein shown, the tine units 31 of the opposed tine conveyor assemblies orbit continuously in respective vertical planes on each side of the muffin conveyor 30, and at the same speed as the rate of travel of the conveyor 30, so that upon inward movement of the tine units to pierce the muffins there is no relative shift of the tines and the muffins in the direction of conveyor travel. Thus, regardless of the number of tines contained in the tine units 31, and regardless of the spacing of the muffins relative to each other and the tine units, the muffins will be uniformly pierced on very close centers so that upon subsequent manual separation of the muffins the resulting halves will be of uniform thickness and the manual separation of the muffin halves will be greatly facilitated.

It is known that the most desirable inside surface texture for muffins, and particularly English muffins, is obtained when the muffins are torn apart rather than cut. Thus, whether the improved splitting mechanism is employed to merely pierce the muffins, to facilitate subsequent manual separation of the muffins into halves of uniform thickness, or is arranged to physically separate the halves during interdigitation of the piercing tines, the desired inside surface texture of the muffins, when ultimately used, will be obtained.

Although several embodiments of this invention have been herein shown and described, it will be understood that numerous details of the construction shown may be altered or omitted without departing from the spirit of the invention as defined by the following claims.

I claim:

1. A muffin splitting mechanism comprising a frame, a muffin conveyor moving along said frame, a plurality of tines movable transversely of said conveyor for entering and withdrawing from muffins carried on said conveyor, means for moving said tines in muffin entering and withdrawing directions comprising an endless strand moving parallel with said conveyor, means affording a connection between said strand and said tines to move said tines with said strand, said connection including a first member fixed to said strand and a second member supporting said tines and movable with respect to said first member in a direction transverse to the movement of said strand, and means for reciprocatively moving said second member at predetermined intervals to enter and withdraw said tines from muffins on said conveyor.

2. A muffin splitting mechanism comprising a frame, a muffin conveyor moving along said frame, a plurality of tines movable transversely of said conveyor and adapted to enter muffins carried on said conveyor and to withdraw therefrom, means for moving said tines in muffin entering and withdrawing directions comprising an endless strand moving parallel with said conveyor at the speed thereof, means affording a connection between said strand and said tines to move said tines with said strand, said connection including a first member fixed to said strand and a second member supporting said tines and movable with respect to said first member in a direction transverse to the movement of said strand, a cam follower on said second member, and a fixed cam on said frame and engageable by said follower as the first member is moved by said strand for reciprocating said second member to cause said tines to enter and withdraw from the muffins on said conveyor.

3. A muffin splitting mechanism comprising a frame, a muffin conveyor moving continuously along said frame, a plurality of tines movable transversely of said conveyor and adapted to enter muffins carried on said conveyor and to withdraw therefrom, means for moving said tines in muffin entering and withdrawing directions comprising an endless strand moving parallel with said conveyor at the speed thereof, a flight carried by said strand and a fixed guide for said tines on said flight, a support for said tines movable on said guide in a direction transverse to the movement of said strand, a fixed cam mounted on said frame, and a cam follower carried by said tine support and enagageable with said cam during movement of said strand for moving said tine support reciprocatively to cause said tines to enter and then withdraw from muffins on said conveyor.

4. A muffin splitting mechanism comprising a frame, a muffin conveyor moving along said frame, a plurality of tines movable transversely of said conveyor and adapted to enter muffins carried on said conveyor and to withdraw therefrom, and means for moving said tines to enter and withdraw from muffins on said conveyor, said means comprising a pair of endless strands moving parallel with said conveyor, a flight supported on and extending between said strands, a fixed guide for said tines supported on said flight, a support for said tines slidable on said guide in a direction transverse to the movement of said strands, a fixed cam mounted on said frame, and a cam follower carried by said tine support and engageable with said cam as said strands move with said conveyor.

5. A muffin splitting mechanism comprising a frame, a muffin conveyor moving along said frame, a plurality of tines reciprocatively movable transversely of said conveyor and adapted to enter muffins carried on said conveyor and to withdraw therefrom, and means for causing said tines to enter and then withdraw from muffins on said conveyor, and means comprising an endless strand moving parallel with said conveyor, means affording a connection between said strand and said tines to move said tines with said strand, said connection including a first member fixed to said strand and a second member supporting said tines and movable with respect to said first member in a direction transverse to the movement of said strand, a fixed cam mounted on said frame, a cam follower carried by said second member and engageable with said cam during movement of said strand for reciprocating said second member to enter and withdraw said tines from muffins on said conveyor, and means cooperating with said strand for moving said tines in a direction normal to the plane of said conveyor while said tines are in muffin entering position relative to said conveyor.

6. A muffin splitting mechanism comprising a frame, a muffin conveyor moving along said frame, a plurality of tines reciprocatively movable transversely of said conveyor and adapted to enter muffins carried on said conveyor and to withdraw therefrom, and means for moving said tines in muffin entering and withdrawing directions comprising a pair of endless strands moving parallel with said conveyor and substantially in the plane thereof, means affording a connection between said strands and said tines to move said tines with said strands, said connection including a first member fixed to and extending between said strands, and a second member supporting said tines and movable with respect to said first member in a direction transverse to the movement of said strands, a fixed cam mounted on said frame, a cam follower carried by said second member and engageable with said cam during movement of said strands for reciprocating said second member and cause said tines to enter and withdraw from muffins on said conveyor, and means cooperating with at least one of said strands for moving said tines in a direction away from and generally normal to the plane of said conveyor while said tines are in muffin entering position relative to said conveyor.

7. A muffin splitting mechanism comprising a frame, a muffin conveyor moving along said frame, a plurality of interdigitating tine units movable transversely of said conveyor from each side thereof, said interdigitating tine units being arranged in opposing relation and adapted to enter muffins carried on said conveyor and to withdraw therefrom from opposite directions, and means at each side of said conveyor for moving opposed tine units and causing the tines thereof to enter and withdraw from muffins on said conveyor; each of said means comprising a strand movable with said conveyor and in the direction thereof, means affording a connection between said strand and the respective tine units to move said units with said conveyor, said connection including a first member fixed to said strand and a second member supporting a tine unit for reciprocative movement with respect to said first member in a direction transverse the movement of said strand, fixed cam means supported on said frame, and a cam follower carried by said second member and engageable with said cam means during movement of said strand to reciprocate said second member.

8. A muffin splitting mechanism comprising a frame, a muffin conveyor moving along said frame, a plurality of interdigitating tine units movable transversely of said conveyor from each side thereof, said interdigitating tine units being arranged in opposing coplanar relation and adapted to enter muffins carried on said conveyor and to withdraw therefrom from opposite directions, and means at each side of said conveyor for moving opposed tine units and causing the tines of said units to enter and withdraw from muffins on said conveyor; each of said means comprising a strand movable parallel with said conveyor and in the direction thereof, means affording a connection between said strand and the respective tine units to move said units with said conveyor, each of said tine units being mounted on a respective one of the last named means for reciprocative sliding movement in the direction transversely of said strand and parallel with the plane of said conveyor, fixed cam means extending in the direction of conveyor travel, and a cam follower on each of said tine units engageable with said cam means during movement of said strand for reciprocating said tine units at predetermined intervals.

9. A muffin splitting mechanism comprising a frame, a muffin conveyor moving along said frame, a plurality of interdigitating tine units movable transversely of said conveyor from each side thereof, said interdigitating tine units being arranged in opposing coplanar relation and adapted to enter muffins carried on said conveyor and to withdraw therefrom from opposite directions, and means for moving opposed tine units to cause the tines thereof to enter and withdraw from muffins on said conveyor; said means comprising a pair of strands one on each side of said conveyor and movable parallel therewith, a flight member carried by each of said strands and having a guide thereon for supporting a tine unit to slide in a direction transversely of said strand, a cam follower on each tine unit, and a fixed cam on each side of said conveyor engageable by a respective cam follower as said strands move parallel with the conveyor for actuating said tine units reciprocatively.

10. A muffin splitting mechanism comprising a frame, a muffin conveyor moving along said frame, a plurality of interdigitating tines movable transversely of said conveyor from each side thereof, said interdigitating tines being arranged in opposed individually slidable units thereof and being adapted to enter endwise into muffins carried on said conveyor and to withdraw therefrom from opposite directions, and means for moving said units of tines in muffin entering and withdrawing directions; said means comprising support means for said units movable parallel with said conveyor, and means for actuating opposing units toward and away from each other at predetermined intervals to interdigitate and then withdraw the tines thereof as said support means is moved with said conveyor.

11. A muffin splitting mechanism comprising a frame, a muffin conveyor moving along said frame, a plurality of interdigitating tines movable transversely of said conveyor from each side thereof, said interdigitating tines being arranged in opposed individually slidable units thereof and being adapted to enter endwise into muffins carried on said conveyor and to withdraw therefrom from opposite directions, and means for moving said units of tines in muffin entering and withdrawing directions; said means comprising a pair of endless strands one on each side of said conveyor and movable therewith, a flight carried by each of said strands, means on each flight for slidably mounting one of said units to move reciprocatively in a direction transverse to the movement of said strands, a cam follower on each of said units, and fixed cam means on each side of said conveyor for engaging said cam followers and actuating opposing units toward and away from each other to enter and withdraw said tines from muffins on said conveyor as said strands are moved with said conveyor.

12. A muffin splitting mechanism comprising a frame, a muffin conveyor moving along said frame, a plurality of interdigitating tines movable transversely of said conveyor from each side thereof, said interdigitating tines being arranged in opposed individually slidable units thereof and being adapted to enter endwise into muffins carried on said conveyor and to withdraw therefrom from opposite directions, and means for moving said units of tines in muffin entering and withdrawing directions; said means comprising support means for said units movable parallel with said conveyor, means for actuating opposing units toward and away from each other to interdigitate and then withdraw the tines thereof as said support means is moved with said conveyor, and means for shifting one of said opposed units in a direction normal to the plane of said conveyor while said units are in tine interdigitating relationship.

13. A muffin splitting mechanism comprising a frame, a muffin conveyor moving along said frame, a plurality of interdigitating tines movable transversely of said conveyor from each side thereof, said interdigitating tines being arranged in opposed sets thereof and being adapted to enter endwise into muffins carried on said conveyor and to withdraw therefrom from opposite directions, and means for moving each set of tines in muffin entering and withdrawing directions; said means comprising an endless strand on each side of said conveyor and movable parallel therewith, means affording a connection between each of said strands and a respective set of tines to move said set parallel with said conveyor and including a first member fixed to the strand and a second member supporting a set of tines and movable with respect to said first member in a direction transverse to the movement of the strand, a fixed cam supported on said frame on each side of said conveyor, and a cam follower carried by each of said second members and engageable with a respective cam for moving opposing tine sets simultaneously into and out of interdigitating relationship across said conveyor.

14. A muffin splitting mechanism comprising a frame, a muffin conveyor moving along said frame, a plurality of interdigitating tines movable transversely of said conveyor from each side thereof, said interdigitating tines being arranged in opposed sets thereof and being adapted to enter endwise into muffins carried on said conveyor and to withdraw therefrom from opposite directions, and means for moving each set of tines in muffin entering and withdrawing directions; said means comprising an endless strand on each side of said conveyor and movable parallel therewith, means affording a connection between each strand and a respective set of tines to move said set parallel with said conveyor and including a first member fixed to the strand and a second member supporting a set of tines and movable with respect to said first member in a direction transverse to the movement of the strand, a fixed cam supported on said frame on each side of said conveyor, and a cam follower carried by each of said second members and engageable with a respective cam for moving opposing tine sets simultaneously into and out of interdigitating relationship across said conveyor, and means for moving one of each pair of opposing tine sets away from and toward the surface of said conveyor in a direction normal to the plane thereof while the tines sets are in interdigitated relation with each other.

15. A muffin splitting mechanism comprising a frame, a muffin conveyor moving along said frame, a plurality of tines on each side of said conveyor and movable transversely of said conveyor into and out of interdigitating relationship with each other, said interdigitating tines being arranged in opposed sets thereof and adapted to enter endwise into muffins carried on said conveyor and to withdraw therefrom from opposite directions, and means for moving opposing sets of tines in muffin entering and withdrawing directions; said means comprising a pair of movable endless strands on each side of said conveyor, means for driving and guiding each pair of said endless strands parallel with said conveyor, means affording a connection between each pair of said strands and a respective set of tines to move said tines with said conveyor, said connection including a flight member fixed to said strands and a second member supporting a set of said tines and movable with respect to said first member in a direction transverse to the movement of said strands and parallel with the plane of said conveyor, a cam follower carried by each of said second members, a fixed cam on each side of said conveyor engageable by the followers on the respective second members to shift the tines thereof into interdigitating relation with each other across the surface of said conveyor, and means for moving the tines of one of the opposing sets in a direction substantially normal to and away from the plane of the conveyor while the tines of the opposing sets are in interdigitated relation.

16. The muffin splitting mechanism of claim 15 wherein the means for moving one of the sets of opposing tines away from the plane of the conveyor comprises means for adjustably varying the level of one of the guiding means for said strands relative to the plane of said conveyor.

References Cited by the Examiner

UNITED STATES PATENTS 2,682,900   7/54   Whitehead _____ 146—72 X

FOREIGN PATENTS 145,284   5/54   Sweden.

ROBERT C. RIORDON, *Primary Examiner.*

CARL W. ROBINSON, J. SPENCER OVERHOLSER,
*Examiners.*